Figure 1:
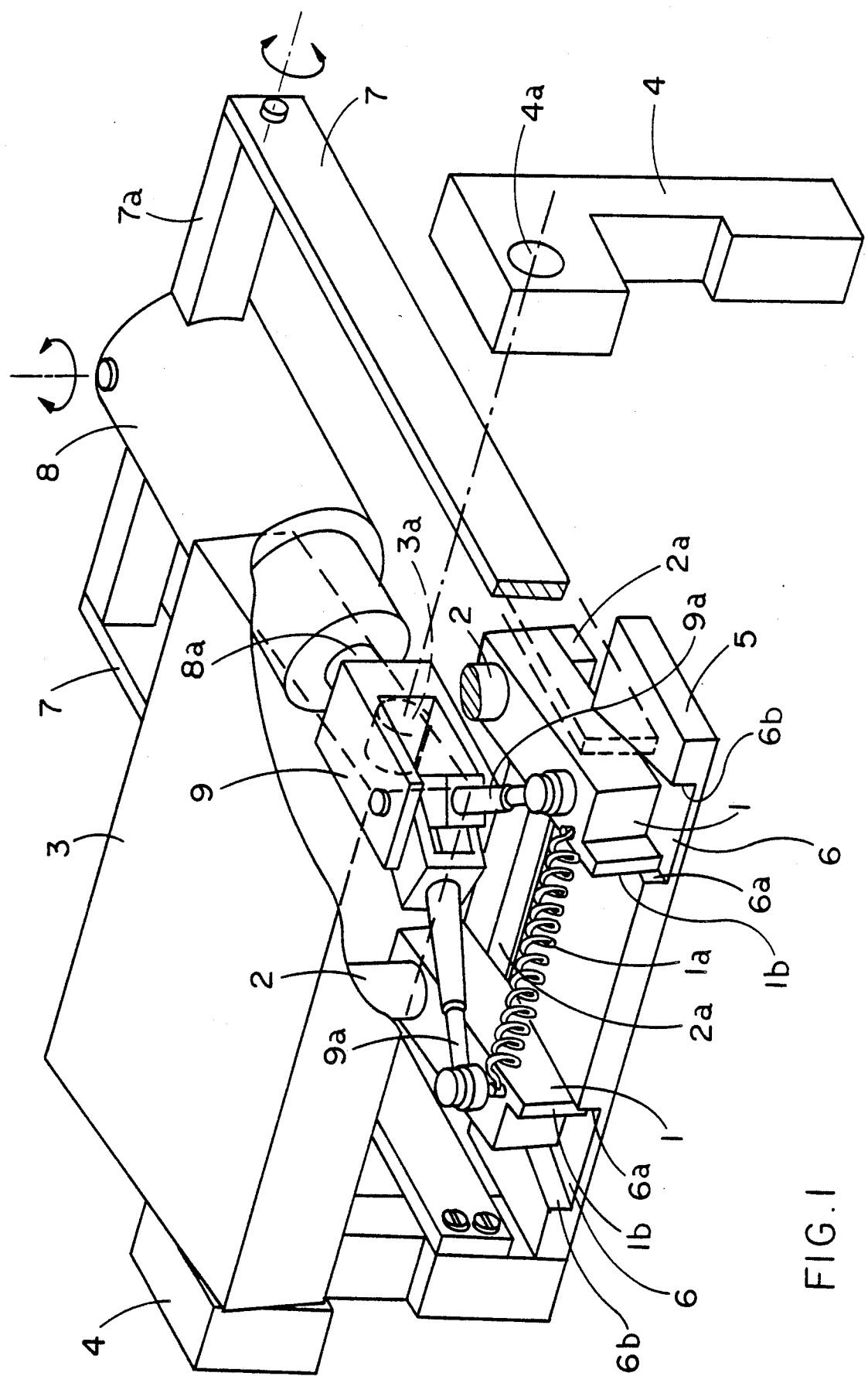

United States Patent [19]

Santicchi

[11] Patent Number: 5,058,722

[45] Date of Patent: Oct. 22, 1991

[54] DEVICE FOR ADJUSTING THE STOP POSITION OF CONVEYOR BELTS USED ON OVERHEAD CONVEYOR SYSTEMS

[76] Inventor: Augusto Santicchi, 06100-Perugia Fraz., San Sisto, Via Albinoni, 151, Italy

[21] Appl. No.: 663,263

[22] Filed: Mar. 1, 1991

[30] Foreign Application Priority Data

Mar. 14, 1990 [IT] Italy ............................ 612 A/90

[51] Int. Cl.⁵ .......................................... B65E 15/64
[52] U.S. Cl. ............................. 198/345.2; 198/832.3
[58] Field of Search ........................ 198/345.2, 832.3

[56] References Cited

U.S. PATENT DOCUMENTS 4,562,919  1/1986  Cattani ........................ 198/345.2 X
4,790,224  12/1988  Krutilla et al. .............. 198/345.2 X Primary Examiner—D. Glenn Dayoan
Assistant Examiner—Cheryl L. Gastineau
Attorney, Agent, or Firm—Leonard Bloom

[57] ABSTRACT

This invention relates to a mechanical device for adjusting the stop position of conveyor belts used on overhead conveyor systems; this device aims at facilitating the insertion of clothes hangers hooks, moved by automatic moving systems, into slots on this belt.

2 Claims, 1 Drawing Sheet

DEVICE FOR ADJUSTING THE STOP POSITION OF CONVEYOR BELTS USED ON OVERHEAD CONVEYOR SYSTEMS

This application for a patent relates to a device for adjusting the stop position of conveyor belts used on overhead conveyor systems and aims at facilitating the insertion of clothes-hanger hooks, moved by means of automatic moving plants, into the slots of this belt.

The device in question is designed for use with overhead conveyor systems for moving clothing items—or any other items which are not too heavy—characterized by a track suspended above the floor which supports and drives a sliding belt having an uninterrupted series of slots used for fixing the articles to be moved.

The applicant company has already filed an application for a design patent involving an automatic machine for moving items from an overhead conveyor to an adjacent conveyor with both the systems at a standstill.

This machine can lift the hanger from the conveyor belt of one system and transfer it to the second system, sliding the hanger hook into a slot on the conveyor belt of the latter.

Obviously, in order to unload the hanger transferred into the slot on the belt of the relevant system, it is especially important for the alignment between the hanger hook and the slot into which the same must be fitted, to be absolutely perfect.

In other words, in order to fit each hanger into the slot of the other conveyor belt, it is necessary that this stops in a position opposite and at the centre of the forward movement of the trolley which supports the clip which lifts and unloads the hanger.

Practical experience in using these conveyor belts has shown that the ideal positioning of the clip and slot of the conveyor belt is not always achieved, and consequently the device according to this invention has been designed in order to guarantee the correct positioning at all times of the overhead conveyor belt in the operating station on which the hanger transferred is unloaded. This device is an absolute novelty in the relevant technical sector, in that this problem has been raised and now resolved for the first time by the Company applying for this patent.

The device in question consists of a fork formed by two branches which oscillate in opposite directions around respective vertical pins, which, when fully open, have a centre to centre distance exactly equal to the distance between the two external vertical sides of one or more slots placed in adjacent position along the conveyor belt. This opening obviously occurs once the ends of the above branches have fitted inside the slot or slots, thereby making the belt run idle in that direction where one of the open branches interferes with the external edge of the slot into which it is fitted.

This means that the device in question can make small centering runs backwards and forwards along the conveyor belt, according to whether this has stopped in a position which is too far forward or too far back with respect to the correct position which would allow the hanger to be unloaded by the clip transferring the same.

For major clarity the description of the device according to the invention continues with reference to the enclosed drawings which are intended purely for purposes of illustration and not in a limiting sense, where:

FIG. 1 is an axonometric illustration of the device according to the invention, without some components and with the movement of another for major clarity.

With reference to this drawing, the device in question uses an opening tool consisting of two branches (1) which oscillate in the opposite direction on a horizontal plane and are constantly drawn to each other by a pre-stretched helicoidal spring (1a) whose ends are hooked for this purpose on the front section of the branches (1).

These branches (1) are also fitted with teeth (1b) at the front and pivoted, at the rear ends, on respective pins having a vertical axis (2) and screwed at the top on the bottom face of a support base (3) which in turn oscillates with respect to a horizontal axis, in that it has side pins (3a) sliding idle in housings (4a) on the sides (4) of the main supporting frame of the device.

In this regard, it should be noticed that these upright pins (2) in turn act as supports for a transverse bar having a horizontal axis (2a), immediately above which the pair of oscillating branches (1) is positioned.

This frame also includes a horizontal plate (5) to whose opposite sides the above sides (4) are fixed, and on whose upper face, there are two identical and symmetrical transverse housings (6) extending from its rear edge to the front edge; the internal edges (6a) of these housings (6) are parallel and exactly perpendicular to the longitudinal axis of the plate (5), while the external edges (6b) of these housings (6) tend to diverge forwards.

In particular, the external edges (6b) of the housings (6) form the end of stroke opening stop for the pair of branches (1), just as the internal edges (6a) of these housings (6) act as end of run closing stop for the same pair of branches (1).

On the internal face of the sides (4) of the above frame, are screwed the horizontal battens (7) of a supporting "C" shaped structure whose crosspiece (7a) supports, in the middle, the pneumatic cylinder lining (8) having a horizontal axis, whose rod (8a) is connected to a double toggle joint (9), whose articulated rods (9a) are hinged on the front ends of the two oscillating branches (1).

In order to clarify the operation of this device, it is pointed out that its frame is firmly fixed to the sliding track of the slotted belt so that, on one hand, the slots on this belt are positioned well before the pair of oscillating branches (1) and, on the other hand, the base (5) of the frame is in a perfectly horizontal position. The distance between the slotted belt and the base (5) must naturally be sufficient for the branches (1) to enter, at the end of the stroke, with their teeth (1b), into the slots of the belt.

It is also pointed out that in this same centering station, a guide track for the belt can also be used, preset to keep the latter in the most suitable position with respect to the branches (1) of the opening device according to the invention.

When the device in question is at rest, the rod (8a) of the pneumatic cylinder (8) is positioned fully back corresponding to the closed position of the branches (1) which are also positioned fully back inside their respective housings (6), terminating against the internal walls (6a) of the latter (6) through the action of the pre-stretched spring (1a) hooked to these; in this situation, the front teeth (1b) of these branches (1) occupy an internal position with respect to the front edge of the plate (5) with the housings (6). As shown in FIG. 1).

When the device is in this rest position, the base (3) moves however into a sub-horizontal position thanks to which the rear edge of the same is higher with respect to the parallel front edge.

Considering that this base (3) supports—by means of the pins (2)—the pair of branches (1), it is evident that the latter must in this case move into an identical inclined position.

Whenever the conveyor belt of the overhead conveyor on which the device is mounted, stops, the cylinder (8) is automatically activated and its rod (8a) consequently expelled to push directly on the branches (1) by means of the articulated rods (9a) of the double toggle joint (9). The force exercised by the rod (8a) first moves the branches (1) forward—from their slanted position all back to a perfectly horizontal position forward—allowed by the free rotation of the base (3) with respect to the upright sides (4) of the support frame, where, as previously indicated, the idle horizontal pins (3a) supporting the base (3) are housed.

This forward movement of the branches (1) stops—always before the rod (8a) has been completely expelled—when the transverse bar (2a) stops against the rear edge of the plate (5).

The thrust produced by the rod (8a) during the final phase of the forward stroke forces the articulated rods (9a) to open and consequently also the branches (1) to open, overcoming the opposing force of the pre-stretched spring (1a).

As mentioned previously, the opening of the branches (1) is limited by their stopping against the external walls (6b) of the housings (6) with which these branches (1) inevitably interfere.

It is once again pointed out that, when the branches (1) are in full forward position, their respective teeth (1b) project from the front edge of the plate (5), penetrating into the slot and in the pair of slots of the conveyor belt which are in front of them.

Considering that the distance between the teeth (1b), when the branches (1) are fully open, corresponds exactly to the distance between the external sides of one or more slots, it follows that one of the teeth (1b) will be pushing backwards or forwards on the conveyor belt for as long as one of the teeth (1b) and the edge of the respective slot are engaged.

This means that after the branches are open, the conveyor belt is always taken to a position whereby one of its slots will always be correctly aligned with the clip that unloads the hanger.

Once this centering has been carried out, the rod (8a) of the cylinder (8) is automatically drawn back, so that the branches (1) can close so that they touch against the internal walls (6a) of the housings (6), and so that the branches (1) move back to their inclined position at rest.

I claim:

1. A device for adjusting the stop position of the conveyor belts used on overhead conveyors, characterized by a support consisting of a pair of identical sides (4)—having holes with a horizontal axis (4a) at the top—and connected to a horizontal base plate (5) having two symmetrical housings (6) whose internal walls (6a) are parallel, while the external walls (6b) diverge forwards; in the holes (4a) at the top of the sides (4), idle running pins (3a) are housed which support an oscillating base (3) at the bottom of which two adjacent pins having a vertical axis (2) are fixed—connected to the base by a transverse base—around which two identical branches (1), fitted at the front with respective teeth (1b) and drawn constantly to each other by a pre-stretched spring (1a) hooked to the same, can rotate freely; inside the sides (4) of the support, are firmly secured two horizontal battens (7) of a supporting "C" shaped structure, whose upper crosspiece (7a) supports, in the middle, a pneumatic cylinder (8) having a horizontal axis whose rod (8a) is connected at the front with a double toggle joint (9) including two articulated rods (9a) hinged at the front on the front ends of the branches (1).

2. A device for adjusting the stop position of conveyor belts used on overhead conveyors, according to claim 1, characterized in that the distance and the inclination of the diverging edges (6b) of the housings (6) on the horizontal plate (5) are such that the teeth (1b) can assume, at the maximum opening of the branches (1), a distance equal to that between the external sides of one or more adjacent slots on the conveyor belt, which stop from time to time inside the unloading station of the hangers, in front of the device according to the invention.

* * * * *